United States Patent
Chen et al.

(10) Patent No.: US 7,536,265 B2
(45) Date of Patent: May 19, 2009

(54) SIGNAL ANALYSIS METHOD FOR VIBRATORY INTERFEROMETRY

(75) Inventors: Liang-Chia Chen, Taipei County (TW);
Chung-Chu Chang, Taipei (TW);
Yao-Ting Huang, Taipei (TW);
Jin-Liang Chen, Hsinchu (TW)

(73) Assignees: Industrial Technology Research Institute, Hsin-Chu (TW); National Taipei University of Technology, Da-An District (TW)

( * ) Notice: Subject to any disclaimer, the term of this patent is extended or adjusted under 35 U.S.C. 154(b) by 0 days.

(21) Appl. No.: 11/863,914

(22) Filed: Sep. 28, 2007

(65) Prior Publication Data
US 2008/0243441 A1    Oct. 2, 2008

(30) Foreign Application Priority Data
Mar. 27, 2007    (TW) ............... 96110647 A (51) Int. Cl.
*G01B 9/02* (2006.01)
(52) U.S. Cl. .................................. 702/56
(58) Field of Classification Search ........ 702/56, 702/66, 67, 75–77, 79; 356/511, 23, 217, 356/35.5, 450, 925; 324/76.19, 16.21
See application file for complete search history.

(56) References Cited

U.S. PATENT DOCUMENTS

| | | | | |
|---|---|---|---|---|
| 4,948,247 | A * | 8/1990 | Lapeyre | 356/23 |
| 5,020,904 | A * | 6/1991 | McMahan, Jr. | 356/35.5 |
| 6,489,611 | B1 * | 12/2002 | Aumond et al. | 250/306 |
| 7,099,782 | B2 * | 8/2006 | Hitchcock et al. | 702/56 |
| 7,443,513 | B2 * | 10/2008 | Rembe | 356/511 |
| 7,474,407 | B2 * | 1/2009 | Gutin | 356/479 |
| 2004/0117146 | A1 * | 6/2004 | Liu et al. | 702/172 |
| 2005/0007599 | A1 * | 1/2005 | deGroot | 356/511 |
| 2005/0280830 | A1 * | 12/2005 | Rembe | 356/511 |
| 2006/0250891 | A1 * | 11/2006 | Krohn | 367/38 |
| 2007/0046953 | A1 * | 3/2007 | De Groot et al. | 356/512 |

\* cited by examiner

*Primary Examiner*—Michael P. Nghiem
*Assistant Examiner*—Cindy H Khuu
(74) *Attorney, Agent, or Firm*—WPAT, P.C.; Justin King (57) ABSTRACT

The present invention relates to a signal analysis method for vibratory interferometry to identify the vibratory characteristics of an object under test. A vibratory stroboscopic interferometric signal of an object under vibration is obtained. The vibratory stroboscopic interferometric signal is analyzed with a deconvolution operation to obtain a reformed vibratory stroboscopic interferometric signal.

7 Claims, 7 Drawing Sheets

FIG. 1 (Prior Art)

Static Interferometric Signal

SIGNAL ANALYSIS METHOD FOR VIBRATORY INTERFEROMETRY

BACKGROUND OF THE INVENTION

1. Field of the Invention

The present invention generally relates to a signal analysis method. Particularly, the present invention relates to a signal analysis method for vibratory interferometry.

2. Description of the Prior Art

The conventional optical interferometric surface profilometer has been developed mainly for static measurement of nano-scale three-dimensional surface profiles. It has been widely employed for measuring surface roughness and uniformity on semiconductor wafers, depth of laser marks, metal-bump size and co-planarity during flip chip bonding, size and height of spacers in liquid-crystal display panels, and surface profile of fiber end-face and micro optical devices. In recent years, vibratory measurement has been incorporated into the optical interferometric surface profilometer, thus widening its applications in observing and measuring the vibratory behavior of functional elements and thin-films in micro-electro-mechanical system (MEMS) and micro-opto-electro-mechanical system (MOEMS) industries.

Figure 1:
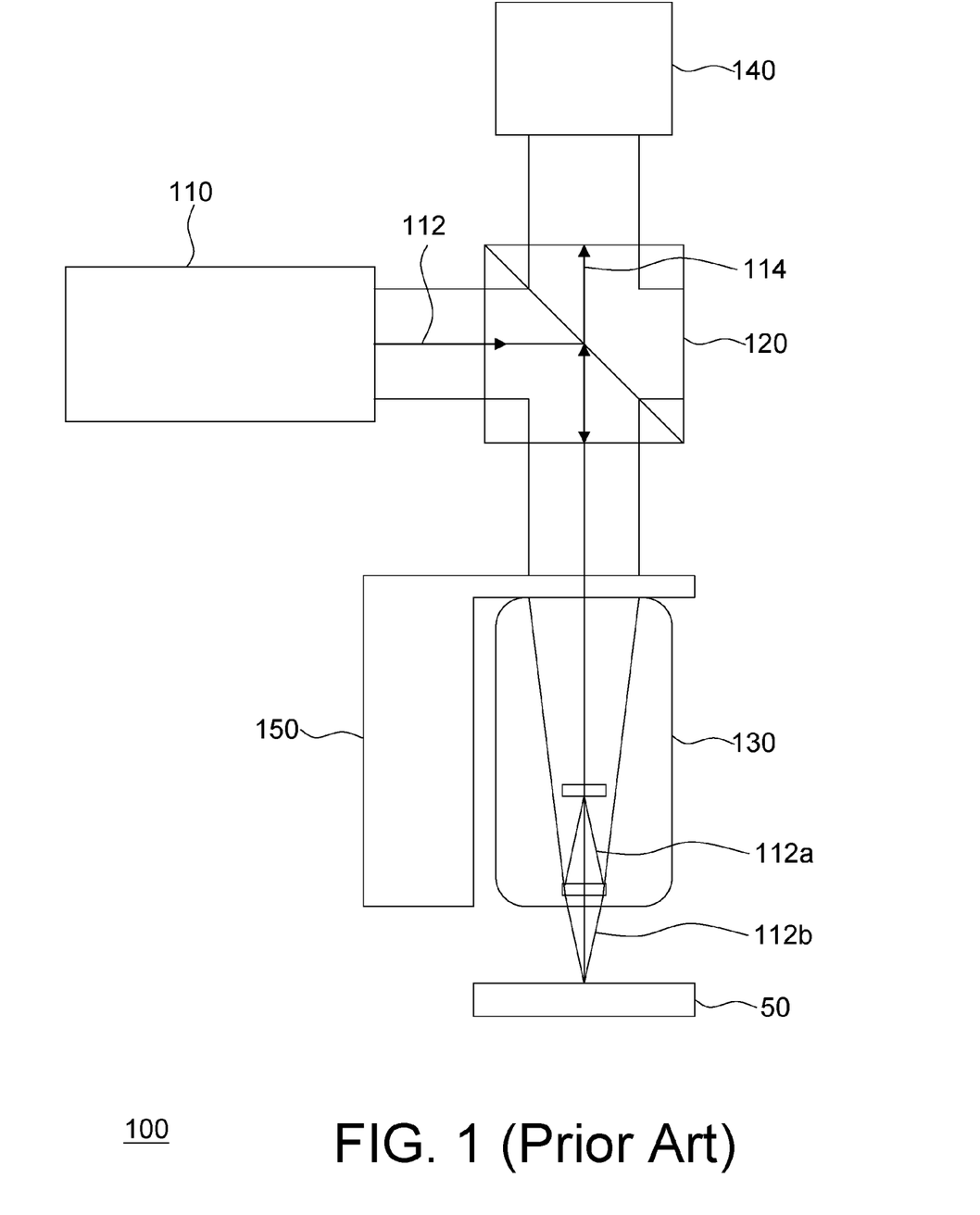
FIG. 1 is a schematic diagram showing a conventional static measurement apparatus.

FIG. 1 is a schematic diagram showing a conventional static measurement apparatus 100, which comprises a light generator 110, a beam-splitter 120, an interferometric objective 130, an image formation unit 140 and a vertical scanner 150. This static measurement apparatus 100 can obtain the static surface profile of the object 50 under test using white-light vertical interference fringes generated, as disclosed in Taiwan Patent No. I237685.

When making a measurement, a light beam 112 generated by the light generator 110 is reflected by the beam-splitter 120 into the interferometric objective 130. The interferometric objective 130 then splits the light beam 112 into a reference light beam 112a and a measurement light beam 112b. The measurement light beam 112b is projected onto the object 50 under test and then reflected back to the interferometric objective 130. The reflected measurement light beam 112b then combines with the reference light beam 112a again to form an interfered light beam 114. The interfered light beam 114 then passes through the beam-splitter 120 into the image formation unit 140 to form an image with interference fringes.

The image formation unit 140 is a light integrator array, which can be a charge-coupled device (CCD). The intensity of the interfered light beam 114 received by any pixel of the image formation unit 140 corresponds to the interference in a specific region on the object 50 under test. The difference in optical path between the reference light beam 112a and the measurement light beam 112b is adjusted by moving the vertical scanner 150. This can control the intensity of the interfered light beam 114 for acquiring static interferometric signals, indicated by the changes in interference intensity due to differences in optical path.

Figure 2A:
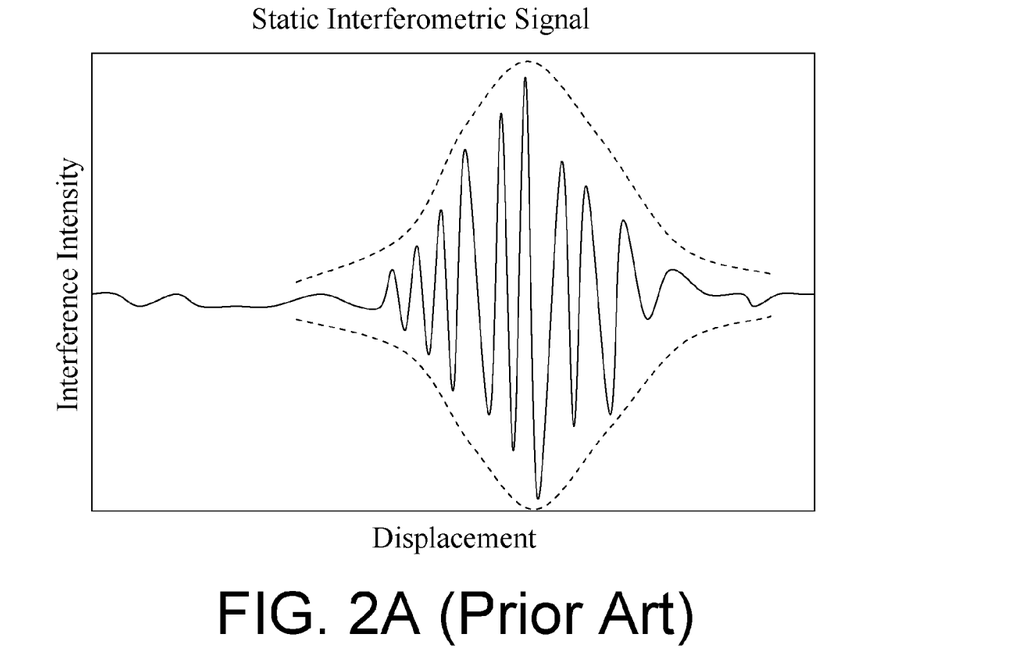
FIG. 2A is a graphic representation of a static interferometric signal.
Figure 2B:
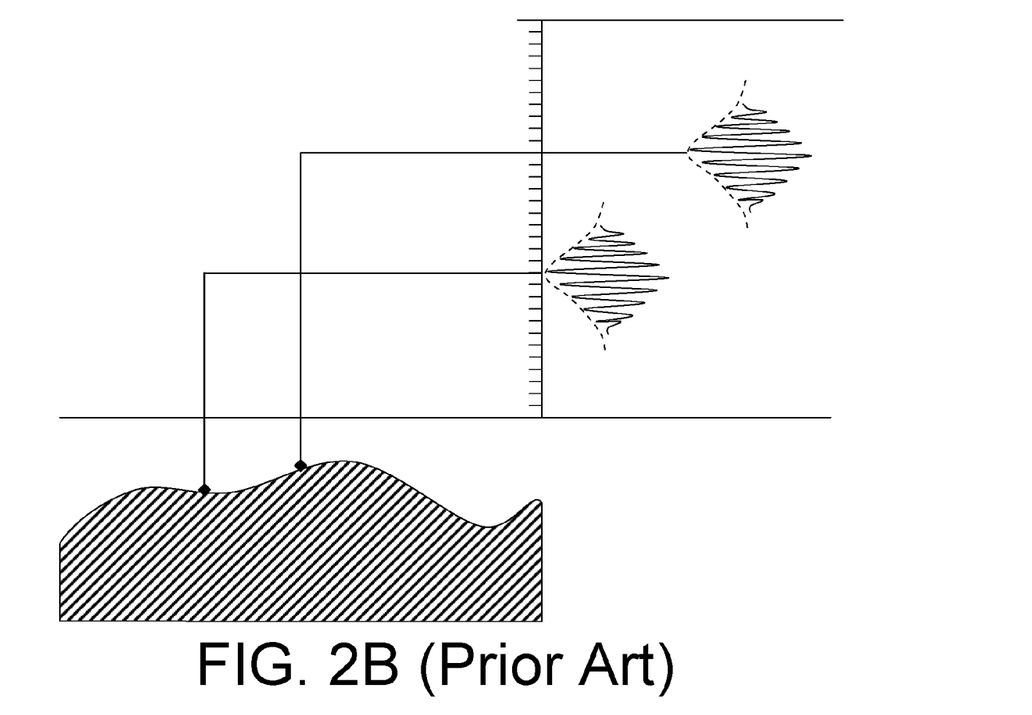
FIG. 2B is a schematic diagram showing the relation between the displacement corresponding to the maximum interference intensity and the surface profile of an object under test.

FIG. 2A is a graphic representation of a static interferometric signal, where the horizontal axis corresponds to the displacement of the vertical scanner and the vertical axis corresponds to the interference intensity. FIG. 2B is a schematic diagram showing the relation between the displacement corresponding to the maximum interference intensity and the surface profile of the object under test. With reference to FIG. 1, FIG. 2A and FIG. 2B, for any region on the object 50 under test, changing the displacement of the vertical scanner 150 can acquire static interferometric signals of different intensities. Generally speaking, the position with the maximum interference intensity corresponds exactly to the height of the surface profile of the object 50 under test. In other words, the shape of the interferometric signal can be enclosed by a wave-packet, in which the exact position of the signal peak corresponds to the height of the surface profile of the object 50 under test.

When the height of the surface profile of the object 50 under test changes, the displacement of the vertical scanner 150 corresponding to the intensity of the interfered light beam 114 will also vary, thus changing the position with maximum interference intensity. Therefore, the surface profile of the object 50 under test can be obtained by measuring the exact positions where the maximum interference intensity occur for all regions on the object 50 under test.

According to the above, three-dimensional profile reconstruction using static interferometric signals begins with obtaining the exact position where the maximum interference intensity occurs for any pixel in order to calculate the height of the surface profile of the corresponding region on an object under test. Calculating the heights of all the regions on the object 50 under test yields the complete surface profile image of the object under test. In addition to surface profile image reconstruction, static interferometric signals can also be employed for measuring static characteristics of the object under test.

Figure 3:
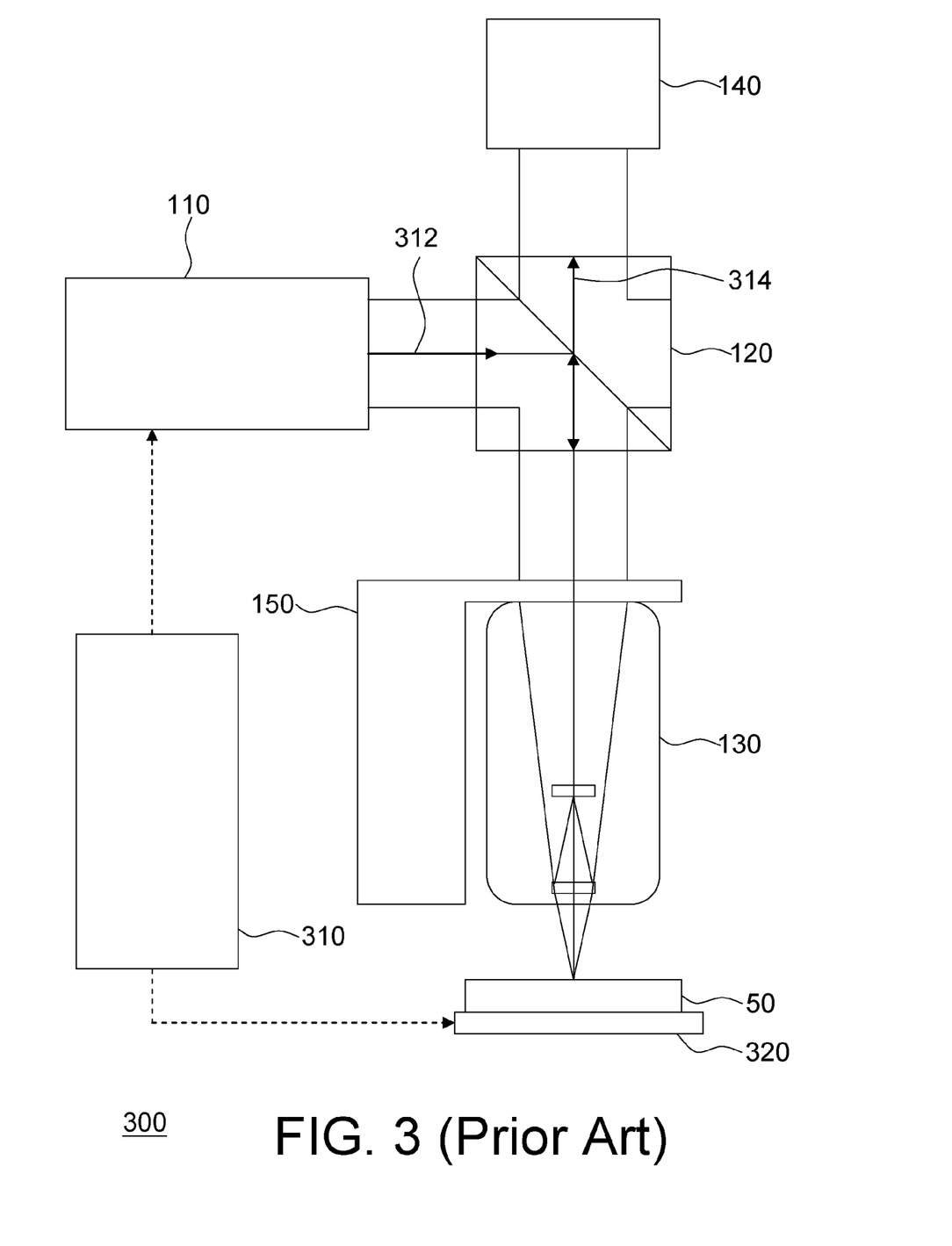
FIG. 3 is a schematic diagram showing a conventional vibratory measurement apparatus.

FIG. 3 is a schematic diagram showing a conventional vibratory measurement apparatus 300, which is similar to the static measurement apparatus 100 (shown in FIG. 1), except that it comprises in addition a strobe controller 310 and a driver plate 320. It can be used for measuring the vibratory characteristics and the surface profile of the object tested 50 under vibration.

When making the measurement, the object 50 under test is placed on the driver plate 320. The strobe controller 310 outputs signals of the same frequency into both the light generator 110 and the driver plate 320. The light generator 110 then generates a stroboscopic pulse 312 of a specific frequency, causing the driver plate 320 with the object 50 under test to vibrate at this specific frequency.

The stroboscopic pulse 312 then passes through the beam-splitter 120, the interferometric objective 130 and the object 50 under test to form an interfered light beam 314, which is fed into the image formation unit 140 to form an interference image. For any pixel of the image formation unit 140, displacement of the vertical scanner 150 will lead to changes in intensity of the interfered light beam 314. These changes due differences in optical path yield vibratory interferometric signals.

In the same way, obtaining the exact position where the maximum interference intensity occurs for a vibratory interferometric signal will give the height of the surface profile of the corresponding region on the object 50 under test; and calculating the heights of all the regions on the object 50 under test yields the complete surface profile image of the object under test. In addition to surface profile image reconstruction, vibratory interferometric signals can also be employed for measuring vibratory characteristics of the object under test.

Figure 4A:
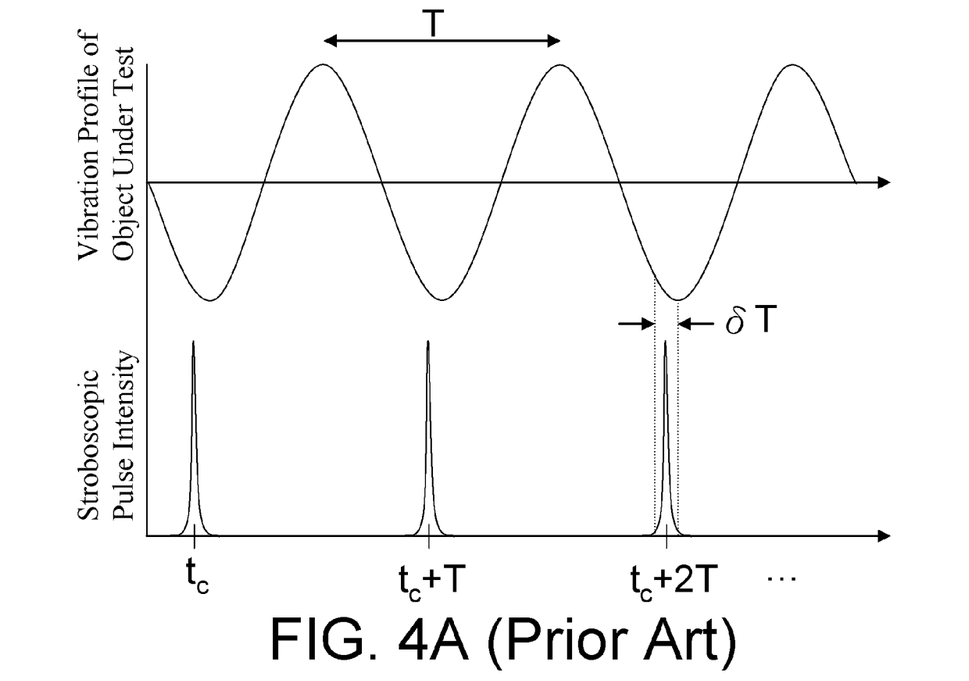
FIG. 4A is a graphic representation of the vibration profile of an object under test and the changes in intensity of the stroboscopic pulse.

FIG. 4A is a graphic representation of the vibration profile of an object under test and the changes in intensity of the stroboscopic pulse. With reference to FIG. 3 and as seen in FIG. 4A, the vibration cycle T of the object 50 under test is identical to a cycle of change in intensity of the stroboscopic pulse 312. There exists between the stroboscopic pulse 312 and the beginning of the vibration cycle of the object 50 under test a delay of $t_c$, which can be adjusted arbitrarily. In general, the pulse time $\delta T$ of the stroboscopic pulse 312 is much shorter than the vibration cycle T of the object 50 under test. Thus, the surface profile of the object 50 under test remains almost static during the pulse time δT when the stroboscopic pulse 312 is incident on the object 50 under test.

By using the above approach, a vibratory interferometric signal with good interference contrast can be obtained to calculate the exact position with maximum interference intensity for three-dimensional profile reconstruction for the object 50 under test in a vibrating mode.

However, with increase in vibrating frequency of the object 50 under test, the vibration cycle T of the object decreases and no longer exceeds the pulse time δT of the stroboscopic pulse 312. This leads to greater variation in the surface profile of the object 50 under test during the pulse time δT when the stroboscopic pulse 312 is incident on the object 50 under test. As a result, the interfered light beam 314 will include the interference information obtained from different positions of the vibratory surface profile of the object 50 under test. The interference contrast of the vibratory interferometric signal decreases after the interfered light beam 314 is integrated by the image formation unit 140.

Figure 4B:
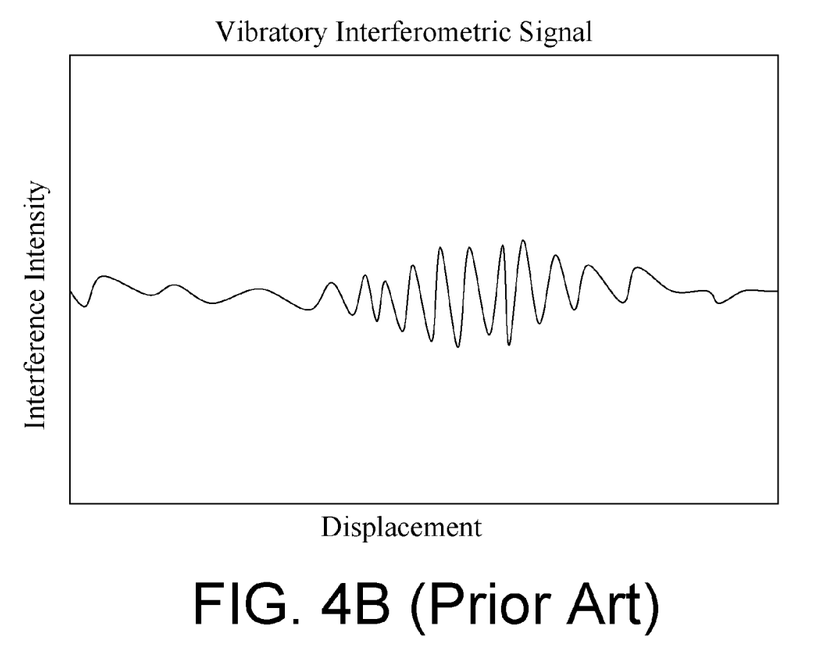
FIG. 4B is a graphic representation of a vibratory interferometric signal for an object under high-frequency vibration.

FIG. 4B is a graphic representation of a vibratory interferometric signal for an object under high-frequency vibration. With reference to FIG. 3, FIG. 4A and FIG. 4B, since the vibration cycle T of the object 50 under test does not exceed the pulse time δT of the stroboscopic pulse 312, the interference contrast of the vibratory interferometric signal decreases, resulting in image blurs (with lowered signal-to-noise ratio). Difficulty in calculating the exact positions with maximum interference intensity for vibratory interferometric signals will undermine the accuracy in reconstructing the three-dimensional profile of the object 50 under test.

Although the interference contrast of the vibratory interferometric signal can be enhanced by shortening the pulse time δT of the stroboscopic pulse 312, there is a limitation in such because the stroboscopic pulse 312 is not a mathematically ideal delta function. In view of the above, the conventional vibratory measurement method is not suitable for obtaining the surface profile of an object under high-frequency vibration.

SUMMARY OF THE INVENTION

It is an object of the present invention to provide a signal analysis method for vibratory interferometry, capable of measuring vibratory characteristics and the surface profile of an object under high-frequency vibration.

To achieve the foregoing and other objects, one embodiment of the present invention provides a signal analysis method for vibratory interferometry, capable of measuring vibratory characteristics and the surface profile of an object under high-frequency vibration. The method comprises steps of (1) obtaining vibratory interferometric signals from the surface profile of the object under vibration, and (2) analyzing the vibratory interferometric signals by the deconvolution operation to obtain the reformed vibratory interferometric signals.

To achieve the foregoing and other objects, another embodiment of the present invention provides a signal analysis method for vibratory interferometry, capable of measuring and reconstructing the surface profile of an object under test in a vibratory mode. This method comprises steps of (1) setting a phase of the stroboscopic pulse, (2) obtaining vibratory interferometric signals from the vibratory surface profile of the object under test, (3) analyzing the vibratory interferometric signals by the deconvolution operation to obtain reformed vibratory interferometric signals, and (4) reconstructing a three-dimensional surface profile image of the object under test using the reformed vibratory interferometric signals and by changing the phase of the stroboscopic pulse.

BRIEF DESCRIPTION OF THE DRAWINGS

The objectives and advantages of the preferred embodiment of the present invention can be readily understood by the accompanying drawings and detailed descriptions, wherein.

DETAILED DESCRIPTION OF THE PREFERRED EMBODIMENT

The present invention can be exemplified by the preferred embodiment as described hereinafter.

Figure 5:
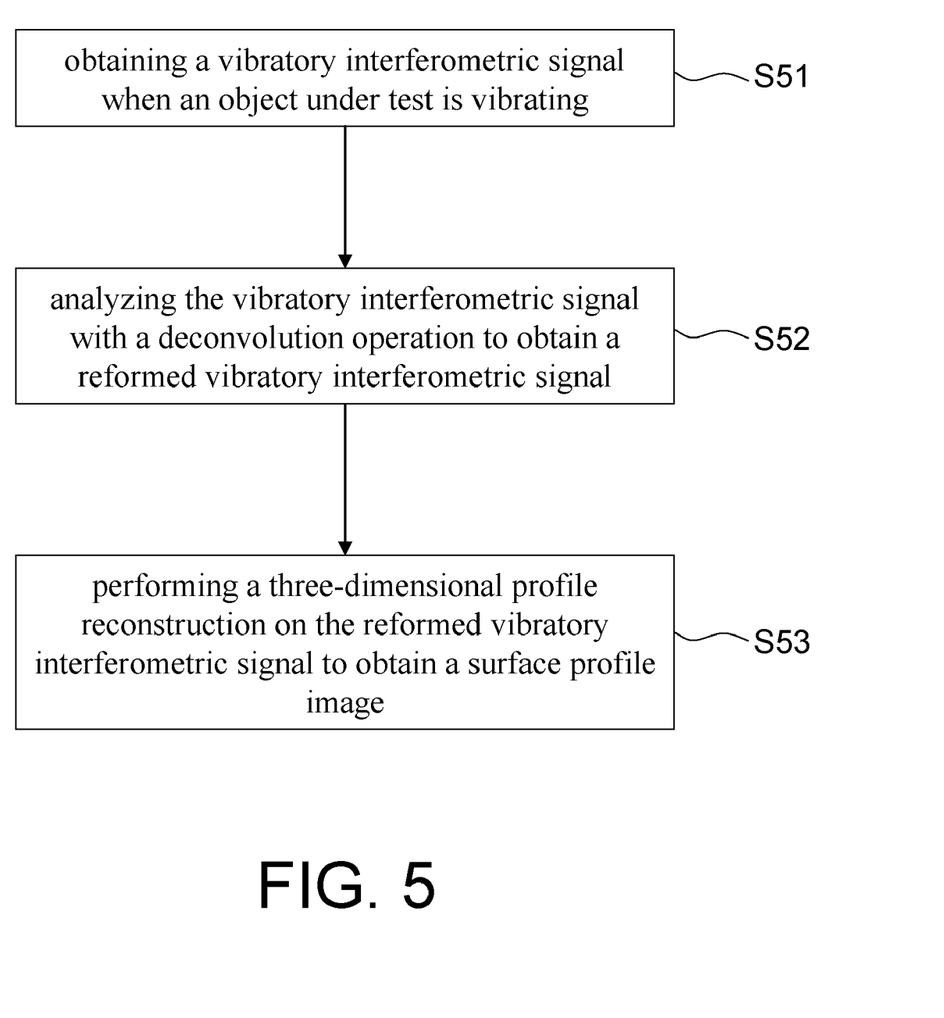
FIG. 5 is a flow-chart for measuring the vibratory surface profile of an object under test using one embodiment of the present invention.

FIG. 5 is a flow-chart for measuring the vibratory surface profile of an object under test using one embodiment of the present invention. The signal analysis method for vibratory interferometry in the present invention uses a vibratory measurement apparatus as shown in FIG. 3. With reference to FIG. 3 and FIG. 5, the signal analysis method for vibratory interferometry comprises steps described hereinafter:

In Step S51, a vibratory interferometric signal is obtained when the object 50 under test is in a vibrating mode. The vibratory interferometric signal indicates changes in intensity of the interfered light beam 314 due to differences in optical path. The process for obtaining the vibratory interferometric signal has been described and is thus not to be repeated here.

When the object 50 under test is vibrating at a high frequency, the interference contrast of the vibratory interferometric signal decreases. A reformed vibratory interferometric signal can be obtained by analyzing the vibratory interferometric signal using the deconvolution operation as in Step S52. The reformed vibratory interferometric signal has a higher interference contrast. It is noted that, if the "static" interference (relative to a perfect stroboscopic pulse 312) of the object 50 under test and the (actual) stroboscopic pulse 312 are considered to involve a convolution operation, then performing the deconvolution operation on the vibratory interferometric signal can yield the reformed vibratory interferometric signal that corresponds to the "static" interference of the object 50 under test. Derivation of related formulas and theory will be described in detail hereinafter.

In one embodiment of the present invention, a three-dimensional surface profile image of the object under test is reconstructed using the reformed vibratory interferometric signals as in Step S53. The reconstruction is precise and yields a more accurate surface profile of the object 50 under test since the reformed vibratory interferometric signals used have a higher interference contrast. Note that the process for three-dimensional surface profile reconstruction using static/vibratory interferometric signals described above is also suitable for reconstruction using reformed vibratory interferometric signals. Moreover, the present invention can also be applied for analyzing reformed vibratory interferometric signals to obtain vibratory characteristics of the object 50 under test.

Hereinafter, part of related formula derivation and theory will be described. First, the interferometric light intensity in an arbitrary region on the object 50 under test can be expressed as:

$$I(z) = I_0[1 + C(z)\cos(4\pi z/\lambda_{mc} + \Delta\varphi)] \quad (1)$$

where I is the interferometric light intensity that varies with the position z of the surface of the object under test; $I_0$ is the mean interferometric light intensity; $C(z)$ is the interference contrast; $\lambda_{mc} = 2(m/(1+f))$, with f being the correction coefficient of the eyepiece lens and m indicating the ordinal number of the interference fringe; and $\Delta\varphi$ is the phase shift difference.

The interferometric light intensity can be expressed in different mathematic formats according to the interferometric measurement apparatus used. In the present embodiment, a Mirau interferometer is only used as an example and other interferometers can also be used as well.

When the object 50 under test is vibrating as a sinusoidal function with an amplitude a, a vibrating frequency $\omega$, and a phase $\phi$, the position z on the surface region of the object 50 under test can be expressed as:

$$z(\omega, t, a) = z_0 + z_1(\omega, t, a) \quad (2)$$

$$z_1(\omega, t, a) = a\sin(\omega t + \phi) \quad (2\text{-}1)$$

where $z_0$ is the position of zero optical path difference or the initial position of the object 50; $z_1$ is the vibratory moving distance; t is a time parameter; and $\phi$ is the phase shift difference.

Substituting Equations (2) and (2-1) into Equation (1) yields the interferometric light intensity when the object 50 under test is vibrating:

$$I(z(\omega, t, a)) = I_o\left[1 + C(z(\omega, t, a))\cos\left(\frac{4\pi}{\lambda_{mc}}(z(\omega, t, a)) + \Delta\varphi\right)\right] \quad (3)$$

$$= I_o\left[1 + C(z_0 + z_1(\omega, t, a))\cos\left(\frac{4\pi}{\lambda_{mc}}(z_0 + z_1(\omega, t, a)) + \Delta\varphi\right)\right]$$

When the time parameter t in Equation (3) is fixed as a constant, the vibrating object 50 under test is in a "static" interference mode. In other words, for a prefect stroboscopic pulse 312 (a mathematically ideal delta function), Equation (3) can be regarded as in a "static" interference mode.

However, Equation (3) is actually in an interference mode, which is the target condition of the present invention because the stroboscopic pulse 312 is not an ideal delta function. Instead, the stroboscopic pulse 312 can be expressed as a Gaussian function:

$$P(t) = P_c e^{-(t-t_c)^2/2\delta_T^2} \quad (4)$$

where $\delta_T$ is the standard deviation of the stroboscopic pulse; $P_c$ is the maximum light intensity; $t_c$ is the pulse center of the stroboscopic pulse (i.e., the delay time $t_c$ in FIG. 4A).

The t-domain stroboscopic pulse 312 can be transformed into a z-domain stroboscopic pulse, expressed as:

$$P(z(\omega, a, t)) = P_c e^{-\left(\frac{1}{v}(z-z_c)\right)^2/2\delta_{zT}^2} \quad (5)$$

where $z_c$ is the pulse center of the z-domain stroboscopic pulse 312; $\delta_{z_T}$ is the light intensity distribution on the z-axis in the standard deviation; z is the axis, along which the vertical scanner 150 displaces; and v is the vibrating speed of the object 50 under test ($v = a\omega \cos(\omega t + \phi)$).

The interfered light beam 314 can be regarded as the output of the convolution operation between the stroboscopic pulse 312 and the vibratory interferometric light intensity of a vibratory object 50 under test. The intensity $I_s$ of the interfered light beam 314 can be expressed as:

$$I_S(z(\omega, t, a)) = I(z(\omega, t, a)) \otimes P(z(\omega, t, a)) \quad (6)$$

$$= I_o\left[1 + C(z(\omega, t, a))\cos\left(\frac{4\pi}{\lambda_{mc}}(z(\omega, t, a)) + \Delta\varphi\right)\right] \otimes P_c e^{-\left(\frac{1}{v}(z-z_c)\right)^2/2\delta_{zT}^2}$$

where $\otimes$ is a convolution operator.

In Equation (6), if the vibrating frequency $\omega$ is fixed and the phase is specified (where the delay time $t_c$ is fixed), the interfered light beam 314 can be obtained by performing the convolution operation between the stroboscopic pulse 312 and the vibratory interferometric light intensity of a vibratory object 50 under test within the width of the stroboscopic pulse 312.

When the vertical scanner 150 displaces to perform vertical scanning, the vibrating center of the object 50 under test keeps moving towards and away from the position of zero optical path difference $z_0$. Therefore, Equation (6) can be written as:

$$I_S(z(\omega, t, a), z_k(t)) = I(z(\omega, t, a), z_k(t)) \otimes P(z(\omega, t, a), z_k(t)) \quad (7)$$

$$= I_0 \begin{bmatrix} 1 + C \\ (z(\omega, t, a) + z_k(t)) \\ \cos\left(\dfrac{4\pi}{\lambda_{mc}}\begin{pmatrix} z(\omega, t, a) + \\ z_k(t) \end{pmatrix} + \Delta\varphi\right) \end{bmatrix} \otimes e^{-\left(\frac{1}{v}(z(\omega,t)+z_k(t)-z_c)\right)^2 / 2\delta_{z_T}^2}$$

where $z_k(t)$ is the distance between the vibrating center of the object 50 under test and the position of zero optical path difference $z_0$.

With a new parameter $d(t)=z(\omega,t,a)+z_k(t)$, Equation (7) can be written as $$I_S(d(t)) = I(d(t)) \otimes P(d(t)) \quad (8)$$

$$= I_0 \left[ 1 + C(d(t))\cos\left(\dfrac{4\pi}{\lambda_{mc}}(d(t)) + \Delta\varphi\right) \right] \otimes$$

$$P_c e^{-\left(\frac{1}{v}(d(t)-z_c)\right)^2 / 2\delta_{z_T}^2}$$

It is noted that, in Equation (8), the intensity of the interfered light beam 314 $I_s$ is denoted by the time domain of parameter t, while the intensity of the interfered light beam 314 $I_s(d(t))$ indicates the actual vibratory interferometric signal measured.

In one embodiment of the present invention, in order to make it easier to obtain the interferometric light intensity I (as shown in Equation (3)) of the vibrating object 50 under test by performing the deconvolution operation on the intensity of the interfered light beam 314 $I_s$, Equation (8) can be written in a frequency-domain format:

$$I_s(d(w))=I(d(w))P(d(w)) \quad (9)$$

Therefore, we obtain the interferometric light intensity I of the vibrating object 50 under test by an inverse operation from the frequency domain to the time domain:

$$I(d(t)) = F^{-1}\left\{\dfrac{I_S(d(w))}{P(d(w))}\right\} \quad (10)$$

where the interferometric light intensity I of the vibrating object 50 under test is the reformed vibratory interferometric signal obtained by the deconvolution operation.

Although the inverse Fourier operation is employed for transforming from the time domain in Equation (10) into the frequency domain, other inverse operations can also be employed in the present invention. For example, an inverse Laplace operation ($\mathcal{L}^{-1}$) can also be used depending on the convenience of operation.

Specifically, the deconvolution operation transforms the time-domain intensity of the stroboscopic pulse 312 into a frequency-domain intensity of the stroboscopic pulse 312. Since the stroboscopic pulse 312 can be set and adjusted, $P(d(w))$ is a known parameter. Moreover, the actual vibratory interferometric signal measured is also transformed from the time domain into the frequency domain, thus giving a frequency-domain intensity $I_s(d(w))$ of the interfered light beam 314.

Then, an inverse operation is performed on the result obtained by dividing the $I_s(d(w))$ of the interfered light beam 314 by the intensity $P(d(w))$ of the stroboscopic pulse 312, thus yielding a reformed vibratory interferometric signal.

Figure 6A:
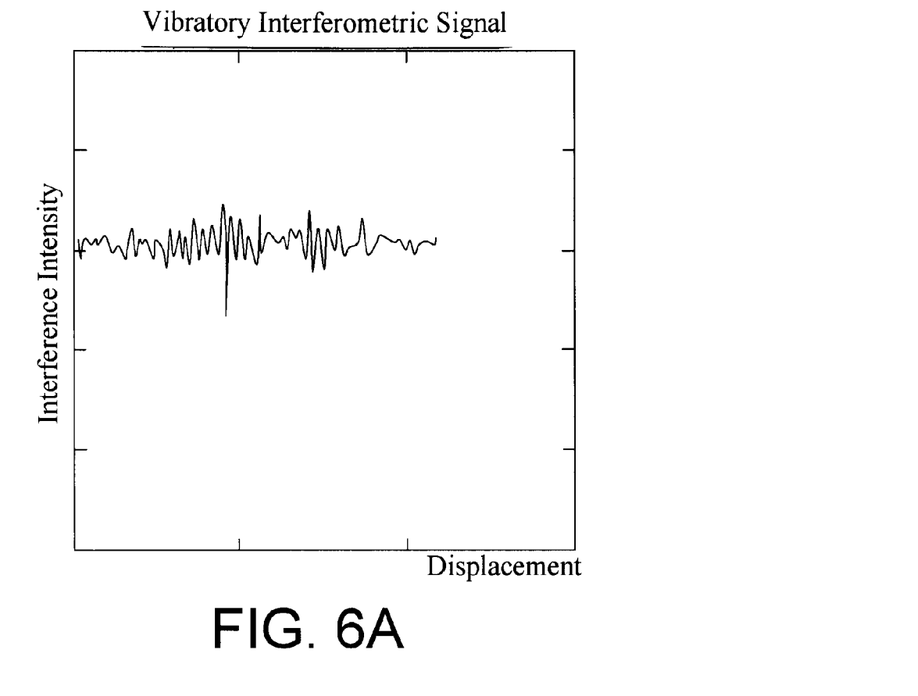
FIG. 6A and FIG. 6B show, respectively, a vibratory interferometric signal and a reformed vibratory interferometric signal.
Figure 6B:
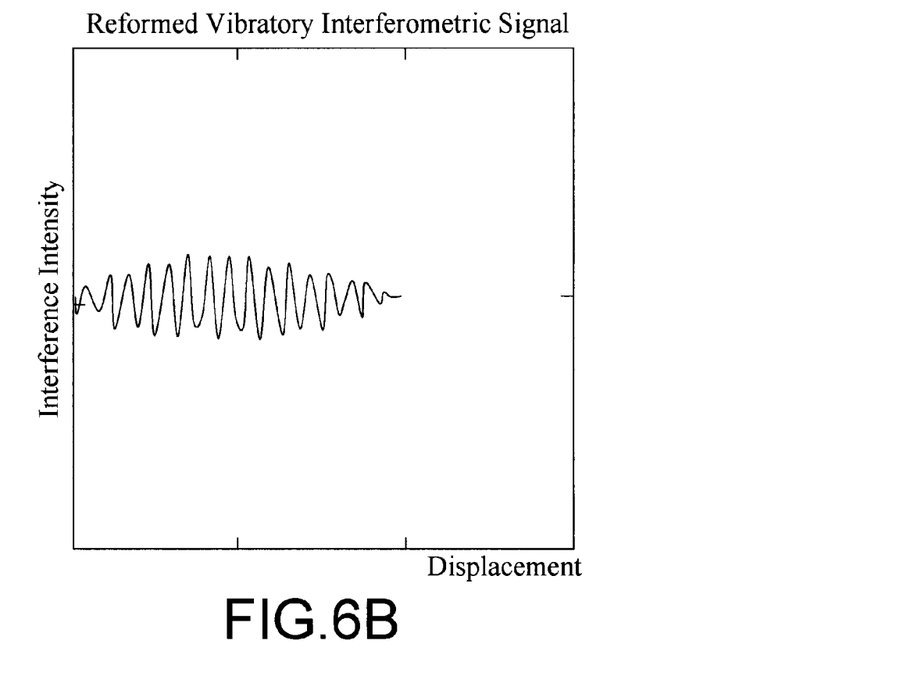

FIG. 6A and FIG. 6B show, respectively, a vibratory interferometric signal and a reformed vibratory interferometric signal. The graphical representation in FIG. 6A and FIG. 6B show the interference intensity as a function of the displacement of the vertical scanner 150 in a region on the object 50 under test, with vibrating frequency ω of 205.4 KHz. With reference to FIG. 6A and FIG. 6B, a reformed vibratory interferometric signal with an enhanced interference contrast can be obtained by performing a deconvolution operation on the vibratory interferometric signal. Therefore, the surface profile of the object 50 under test can be precisely reconstructed and the vibratory characteristics of the object 50 under test can be accurately measured.

One characteristic of the present invention is that the actual vibratory interferometric signal measured is regarded as the result of the convolution operation between the vibratory interferometric signal in Equation (3) and the stroboscopic pulse 312. Thus, the reformed vibratory interferometric mode (i.e., the vibratory interferometric signal in Equation (3)) can be obtained using a deconvolution operation. However, the present invention is only exemplified by but not limited to the afore-mentioned formula derivation and description.

Furthermore, the deconvolution operation is a better method for transforming the time-domain intensity of the stroboscopic pulse 312 into the frequency-domain intensity. Dividing the vibratory interferometric signal by the frequency-domain intensity of the stroboscopic pulse 312, which then undergoes an inverse operation yields the reformed vibratory interference mode. Moreover, the present invention is not limited to the deconvolution operation in Equation (8). In the present invention, the reformed vibratory interferometric signal such as the intensity $I_s(d(w))$, can be obtained by the deconvolution operation in the time domain without a time-frequency domain transformation.

With reference to FIG. 3, the present invention is only exemplified by but not limited to any type of interferometric measurement apparatus and interferometric objective 130 used. For example, the interferometric measurement apparatus can be a Mirau interferometer, a Michelson interferometer, a Linnik interferometer or the like.

In the present embodiment, the light generator 110 is only exemplified by but not limited to a white light emitting diode (LED) for emitting a stroboscopic pulse 312. Moreover, the image formation unit 140 can be a charge-coupled device (CCD), a complementary metal-oxide-semiconductor field-effect transistor (CMOS) device or any other appropriate light integrator array.

Furthermore, the effect of emitting a stroboscopic pulse 312 from the light generator 110 is similar to limiting the time for light reception by the image formation unit 140. The vibratory interferometric signal can also be obtained by controlling the shutter of the image formation unit 140, which is opened and closed periodically.

Figure 7:
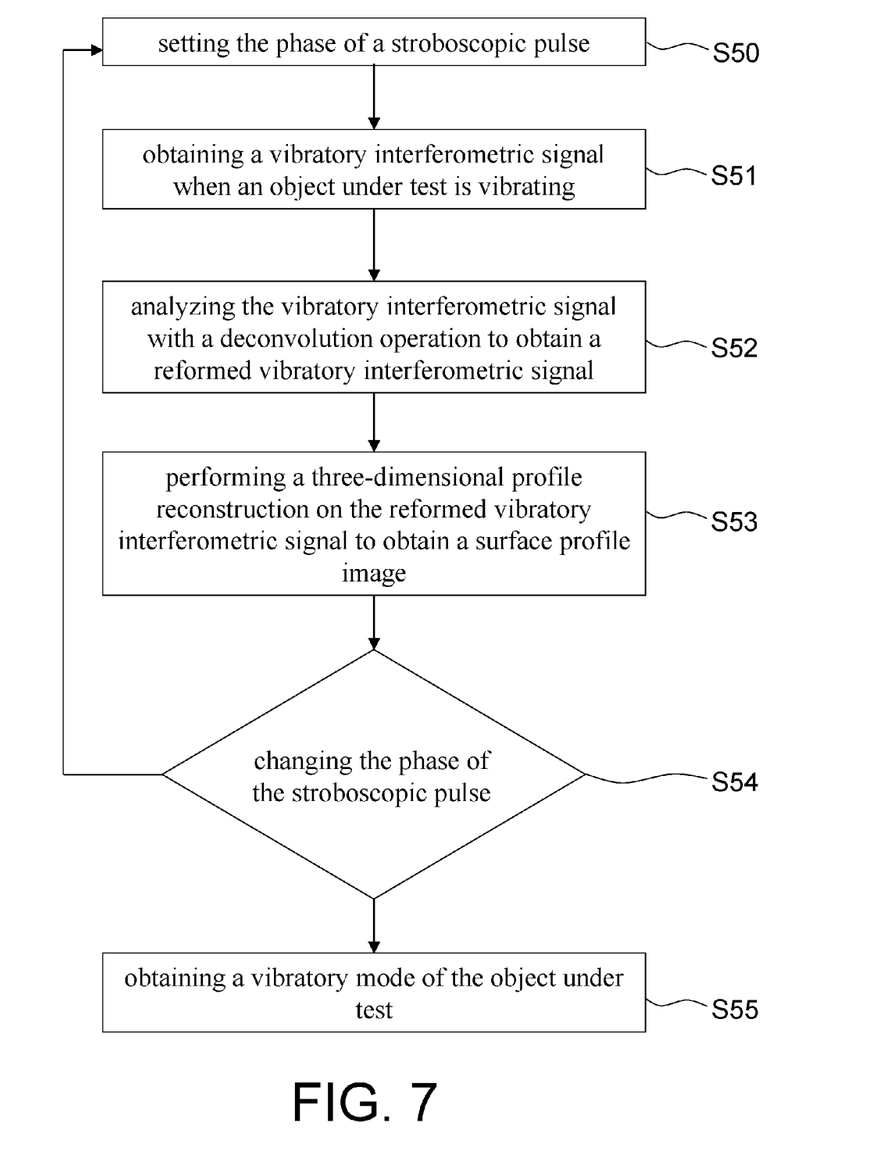
FIG. 7 is a flow-chart for measuring the vibratory surface profile of an object under test using another embodiment of the present invention.

FIG. 7 is a flow-chart for measuring the vibratory surface profile of an object under test using another embodiment of the present invention. This method is similar to that depicted in FIG. 5, except that, in Step S50 the phase of a stroboscopic pulse 312 is pre-set. In other words, the delay time $t_c$ of the stroboscopic pulse 312 is set, as shown in FIG. 4A.

Those with ordinary skills in the art can easily understand that the specific phase of the stroboscopic pulse 312 can be employed to measure the specific phase (such as peak, valley or node) of a vibrating object 50 under test. Thus, the description thereof is omitted. In Step S54, the phase of the stroboscopic pulse can be changed after the surface profile image of the object 50 under test is obtained. In Step S55, a vibratory mode of the object 50 under test can be obtained after the stroboscopic pulse 312 scans all the phases.

Although the afore-mentioned object 50 under test is vibrating due to an external force, the present invention is also suitable for obtaining the reformed vibratory interferometric signal in the case that the object 50 under test is vibrating on its own without external influence.

According to the above discussion, it is apparent that the present invention discloses a signal analysis method for vibratory interferometry, capable of measuring the vibratory characteristics and reconstructing the vibratory surface profile of an object under high-frequency vibration. In the present invention, a deconvolution operation is performed on the vibratory interferometric signal to obtain a reformed vibratory interferometric signal with an enhanced interference contrast. Therefore, the surface profile of the object under test can be precisely reconstructed. The advantage of the present invention is that the reformed vibratory interferometer signal obtained has an enhanced interference contrast, thus ensuring more precise reconstruction of the surface profile of the object especially under high-frequency vibration.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A signal analysis method for vibratory interferometry, capable of measuring vibratory characteristics and a vibratory surface profile of an object under test, comprising steps of:
   obtaining a vibratory stroboscopic interferometric signal using an imaging device when the object under test is vibrating; and
   analyzing the vibratory stroboscopic interferometric signal with a deconvolution operation to obtain a reformed vibratory stroboscopic interferometric signal;
   wherein the deconvolution operation comprises steps of:
      transforming a time-domain stroboscopic pulse intensity into a frequency-domain stroboscopic pulse intensity;
      transforming a time-domain vibratory stroboscopic interferometric signal into a frequency-domain vibratory stroboscopic interferometric signal;
      dividing the frequency-domain vibratory stroboscopic interferometric signal by the frequency-domain stroboscopic pulse intensity and obtaining a frequency-domain quotient; and
      performing an inverse transform operation on the frequency-domain quotient so as to obtain the reformed vibratory stroboscopic interferometric signal.

2. The signal analysis method for vibratory interferometry as recited in claim 1, wherein the inverse transform operation is an inverse Fourier transform operation.

3. A signal analysis method for vibratory interferometry, capable of measuring a vibratory surface profile and a vibratory mode of an object under test, comprising steps of:
   setting a phase of a stroboscopic pulse;
   obtaining a vibratory interferometric signal from the vibratory surface profile of the object under test using an imaging device;
   analyzing the vibratory interferometric signal with a deconvolution operation to obtain a reformed vibratory interferometric signal;
   reconstructing a three-dimensional surface profile image of the object under test using the reformed vibratory interferometric signal; by
   changing the phase of the stroboscopic pulse.

4. The signal analysis method for vibratory interferometry as recited in claim 3, wherein the deconvolution operation comprises a time-frequency domain transformation.

5. The signal analysis method for vibratory interferometry as recited in claim 3, wherein the deconvolution operation comprises steps of:
   transforming a time-domain stroboscopic pulse intensity into a frequency-domain stroboscopic pulse intensity;
   transforming a time-domain vibratory interferometric signal into a frequency-domain vibratory interferometric signal;
   dividing the frequency-domain vibratory interferometric signal by the frequency-domain stroboscopic pulse intensity and obtaining a frequency-domain quotient; and
   performing an inverse transform operation on the frequency-domain quotient to obtain the reformed vibratory interferometric signal.

6. The signal analysis method for vibratory interferometry as recited in claim 5, wherein the inverse transform operation is an inverse Fourier transform operation.

7. The signal analysis method for vibratory interferometry as recited in claim 3, wherein the vibratory characteristics and the vibratory surface profile of the object under test are measured using a Mirau interferometer, a Michelson interferometer or a Linnik interferometer.

* * * * *